UNITED STATES PATENT OFFICE 2,626,259

1,4-QUINOXALINE-DI-N-OXIDES

Justus Kenneth Landquist and Gilbert Joseph Stacey, Blackley, England, assignors to Imperial Chemical Industries Limited, a corporation of Great Britain No Drawing. Application May 19, 1950, Serial No. 163,101. In Great Britain July 20, 1949

7 Claims. (Cl. 260—250)

This invention relates to new quinoxaline derivatives and more particularly it relates to new quinoxaline di-N-oxides which possess a high degree of chemotherapeutic activity.

We have found that certain new quinoxaline di-N-oxides, namely those of the general formula

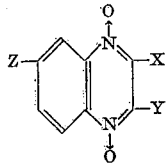

wherein X and Y stand for alkyl groups of fewer than five carbon atoms, the same or different, and wherein Z stands for hydrogen, cyano, methoxy or halogen, possess therapeutic activity against infections with amoebae, with viruses such as that of psittacosis or that of *Lymphogranuloma venereum*, or with gram-negative organisms. We have also found that these compounds possess unexpectedly low toxicity to the host organism.

Our invention therefore comprises the new compounds of the above stated formula.

The said new compounds may be made by oxidation by means of per-acids of the corresponding quinoxalines or their mono-N-oxides, for example by oxidation of the corresponding quinoxalines by means of hydrogen peroxide in glacial acetic acid solution, or by means of peracetic acid, performic acid or monoperphthalic acid. The starting materials, the quinoxalines themselves, may be obtained in the known manner by interaction of the appropriately substituted o-phenylenediamine with an appropriate 1:2-diketone or with functional derivatives thereof, for example the monooxime.

The invention is illustrated but not limited by the following examples in which the parts are by weight.

Example 1

3.9 parts of 2:3-dimethylquinoxaline are dissolved in a mixture of 84 parts of glacial acetic acid and 20 parts of a 90–100 volume aqueous solution of hydrogen peroxide. The solution is then maintained at a temperature between 50 and 60° C. for 18 hours and is then cooled. It is then made alkaline by the addition of 40% aqueous sodium hydroxide below 30° C. and the product is extracted by then shaking the mixture with six successive portions of chloroform. The chloroform extract is dried over sodium sulphate and the chloroform is then distilled off. The solid residue is crystallised from benzene and there is obtained 2:3-dimethylquinoxaline 1:4-di-N-oxide having M. P. 191–192° C.

Example 2

9.6 parts of 6-chloro-2:3-dimethylquinoxaline, 200 parts of glacial acetic acid and 50 parts of 90–100 volume hydrogen peroxide are heated together at 50–55° C. for 20 hours. The solution is then cooled and made neutral to litmus by the addition of 40% aqueous sodium hydroxide together with crushed ice in sufficient amount to keep the temperature below 25° C. The precipitated solid is filtered off, washed with water, dried at 100° C. and crystallised from alcohol to give 6-chloro-2:3-dimethylquinoxaline-1:4-di-N-oxide of M. P. 175–176° C.

The starting material used in the process of this example may be obtained by interaction of 4-chloro-1:2-phenylenediamine with diacetyl in aqueous acetic acid medium.

Example 3

5 parts of 2:3-dimethylquinoxaline and 100 parts of a solution of peracetic acid in acetic acid (containing about 1.2 gram molecules of peracetic acid in a litre) are heated together at 50° C. for 18–20 hours. The solution is then evaporated under reduced pressure to about one fifth of its original volume and is treated with 50 parts of ice and sufficient 40% aqueous sodium hydroxide to neutralise the acid, the final pH of the solution being 6–7. 2:3-dimethylquinoxaline-1:4-dioxide is filtered off and is crystallised from ethanol. It melts at 192–193° C. A further quantity may be obtained by chloroform extraction of the filtrate.

Example 4

7 parts of 6-chloro-2:3-dimethylquinoxaline and 100 parts of a 1.2 molar solution of peracetic acid in acetic acid are heated at 50° C. for 18–20 hours and the mixture is concentrated and neutralised with ice and 40% sodium hydroxide as described in Example 3. The precipitated 6-chloro-2:3-dimethylquinoxaline-1:4-dioxide is filtered off and purified as described in Example 2.

Example 5

12 parts of 6-bromo-2:3-dimethylquinoxaline (M. P. 84–85° C., made by reacting diacetyl with 4-bromo-o-phenylenediamine in dilute aqueous acetic acid medium), 100 parts of anhydrous formic acid and 35 parts of 90–100 volume hydrogen peroxide are heated together to 45–50°

C., the mixture being then kept, by cooling, at 45–55° C. After 30 minutes at 45–55° C. the mixture is heated at 50° C. for 18 hours. It is then evaporated under reduced pressure (20–30 mm.) to one fifth of its bulk and is neutralised by the addition of 40% aqueous sodium hydroxide and sufficient ice is added to keep the temperature below 10° C. The precipitated solid is filtered off and washed with water, and when dry it is crystallised from benzene or ethanol and gives 6-bromo-2:3-dimethylquinoxaline-1:4-dioxide as pale yellow crystals of M. P. 186–188° C.

Example 6

9 parts of 6-cyano-2:3-dimethylquinoxaline, (M. P. 199–200° C., obtained by reacting diacetyl with an aqueous solution of 3:4-diaminobenzonitrile) and 150 parts of a 1.2 molar solution of peracetic acid in acetic acid are heated at 50° C. for 18–20 hours and the solution is concentrated and neutralised as described in Example 3. The yellow precipitate is filtered off, washed with water and crystallised from ethanol, giving 6-cyano-2:3-dimethylquinoxaline-1:4-dioxide as yellow needles, M. P. 216–218° C.

Example 7

26 parts of 2-methyl-3-ethylquinoxaline (Heilbron et al., J. C. S., 1946, 54) and 450 parts of a 1.2 molar solution of peracetic acid in acetic acid are heated at 50° C. for 20 hours, and the mixture is evaporated under reduced pressure (15–20 mm.) to one sixth of its bulk. The solution is then neutralised by the addition of 40% aqueous sodium hydroxide and sufficient ice is added to keep the temperature below 10° C. The solid is filtered off and washed with water. It consists of 2-methyl-3-ethylquinoxaline-1:4-dioxide which may be purified by crystallisation from light petroleum (B. P. 100–120° C.) or from methanol and forms yellow needles of M. P. 139–141° C.

Example 8

6 parts of 2:3-diethylquinoxaline (colourless needles, M. P. 35–37° C., B. P. 149° C./16 mm., made by reacting o-phenylene diamine with dipropionyl) and 100 parts of a 1.2 molar solution of peracetic acid in acetic acid are heated at 50° C. for 20 hours and the product is isolated as described in Example 7. 2:3-diethylquinoxaline-1:4-dioxide crystallises from light petroleum (B. P. 80–100° C.) in pale yellow needles of M. P. 108–110° C.

Example 9

20 parts of 2:3-di-n-propylquinoxaline (colourless prisms, M. P. 43–45° C., B. P. 172–174° C./22 mm., prepared by condensing o-phenylene diamine with di-n-butyryl) and 200 parts of a 1.2 molar solution of peracetic acid in acetic acid are heated at 50° C. for 18 hours and the product is isolated as described in Example 7. The 2:3-di-n-propylquinoxaline-1:4-dioxide is filtered off and crystallised from light petroleum (B. P. 40–60° C.) to give prisms of M. P. 74–76° C.

Example 10

8 parts of 2:3-dimethylquinoxaline and an equimolecular amount of peracetic acid (e. g. 42 parts of a 1.2 molar solution) in acetic acid are heated at 50° C. for 18 hours and the mixture is treated with 150 parts of ice and is then neutralised with 40% aqueous sodium hydroxide. 2:3-dimethylquinoxaline-1-oxide is precipitated as a white solid which is purified by crystallisation from light petroleum (M. P. 100–120° C.) and forms colourless needles of M. P. 92–93° C.

Example 11

5 parts of 2:3-dimethylquinoxaline-1-oxide and 50 parts of a 1.2 molar solution of peracetic acid in acetic acid are heated at 50° C. for 18 hours and the product is isolated as described in Example 3 to give 2:3-dimethylquinoxaline-1:4-dioxide.

Example 12

3.7 parts of 2-methyl-3-n-propylquinoxaline (M. P. 60–61° C., prepared by condensation of o-phenylene-diamine and 2:3-hexanedione) and 67 parts of a 1.34 molar solution of peracetic acid in acetic acid are maintained of 50–55° C. for 18 hours. The solution is then concentrated under reduced pressure to about one quarter of its original volume and the residual liquid is cooled in ice-water while aqueous 20% sodium hydroxide is added until the mixture is just alkaline to Brilliant Yellow. The solid is filtered off, washed with water and dried. It is then recrystallised from a mixture of light petroleum (B. P. 80–100° C.) and benzene in the ratio 4:1, and yields 2-methyl-3-n-propylquinoxaline-1:4-dioxide of M. P. 109–111° C.

Example 13

3.7 parts of 2-methyl-3-isopropylquinoxaline (M. P. 40–42.5° C., B. P. 130–132° C./12 mm., prepared by condensation of o-phenylenediamine and 4-methyl-2:3-pentanedione) and 67 parts of a 1.34 molar solution of paracetic acid in acetic acid are maintained at 50–55° C. for 18 hours. The solution is concentrated under reduced pressure to about one quarter of its original volume and the residue is made alkaline to Brilliant Yellow by slow addition of aqueous 20% sodium hydroxide below 25° C. The oil which separates is extracted with chloroform and recovered by evaporation of the solvent after drying the extract over sodium sulphate. The product is crystallised from a mixture of light petroleum (B. P. 80–100° C.) and benzene in the ratio 4:1, to give 2-methyl-3-isopropylquinoxaline 1:4-dioxide which is further purified by crystallisation from methanol and then has M. P. 193–194° C.

Example 14

3.7 parts of 6-chloro-2:3-di-n-propylquinoxaline (M. P. 73° C., prepared from 4-chloro-1:2-phenylenediamine and 4:5-octanedione) are added, in small quantities, to a mixture of 45 parts of anhydrous formic acid and 15 parts of a 90–100 volume aqueous solution of hydrogen peroxide, previously warmed to 50° C. The mixture is heated at 50–55° C. for 18 hours and then concentrated, under reduced pressure, to about one-quarter of its original volume. The residue, cooled in ice-water, is made alkaline to Brilliant Yellow by addition of aqueous 20% sodium hydroxide and the precipitated oil is extracted with ether, the extracts are washed with water and then dried over anhydrous sodium sulphate. The ether is distilled off, finally under reduced pressure, to leave the product, 6-chloro-2:3-di-n-propylquinoxaline-1:4-di-N-oxide, as an amorphous solid.

Example 15

2.35 parts of 2:3-dimethylquinoxaline are dissolved in 35 parts of dioxan, and 116 parts of a 0.31 molar solution of monoperphthalic acid in ether are added. The mixture is allowed to stand at room temperature for 40 hours and most of the solvent is then distilled off, finally under reduced pressure below 50° C. The residue is treated with 25 parts of 20% aqueous sodium hydroxide and the undissolved solid is extracted with chloroform, and the extract washed with water and dried over anhydrous sodium sulphate. The chloroform is distilled off to leave 2:3-dimethylquinoxaline-1:4-dioxide which is purified by crystallisation from benzene or methanol and has M. P. 190–191° C.

*Example 16*

10 parts of 6-methoxy-2:3-dimethylquinoxaline and 150 parts of a 1.2 molar solution of peracetic acid in acetic acid are heated at 50° C. for 18 hours and the solution is evaporated to one fifth of its volume under reduced pressure. The residue is diluted with 100 parts of ice and water and is rendered slightly alkaline (pH 8) by the addition of 40% aqueous sodium hydroxide. 6-methoxy-2:3-dimethylquinoxaline-1:4-dioxide is precipitated as an orange yellow solid which crystallises from ethanol or benzene in needles of M. P. 197–198° C.

We claim:
1. Quinoxaline-di-N-oxides of the formula

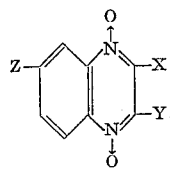

wherein X and Y stand for alkyl groups of fewer than five carbon atoms, and wherein Z stands for a radical from the group consisting of hydrogen, cyano, methoxy, and halogen.

2. The new chemotherapeutically active compounds, 2 - alkyl - 3-alkylquinoxaline-1,4-di-N-oxide, wherein said alkyl groups have fewer than 5 carbon atoms.

3. The new chemotherapeutically active compound, 2,3-dimethylquinoxaline-1,4-di-N-oxide.

4. The new chemotherapeutically active compound, 6-chloro-2,3-dimethylquinoxaline-1,4-di-N-oxide.

5. The new chemotherapeutically active compound 2:3-diethylquinoxaline-1:4-di-N-oxide.

6. The new chemotherapeutically active compound 2 - methyl-3-ethylquinoxaline-1:4-di-N-oxide.

7. The new chemotherapeutically active compound 2-methyl-3-n-propylquinoxaline-1:4-di-N-oxide.

JUSTUS KENNETH LANDQUIST.
GILBERT JOSEPH STACEY.

REFERENCES CITED

The following references are of record in the file of this patent:

UNITED STATES PATENTS

| Number | Name | Date |
| --- | --- | --- |
| 2,416,658 | Van Arendonk | Feb. 25, 1947 |

OTHER REFERENCES

McIlwain: J. Chem. Soc., 1943, 322–325.